Sept. 9, 1924.
H. E. WARREN
CLOCK MOTOR
Filed Oct. 27, 1922
1,508,205
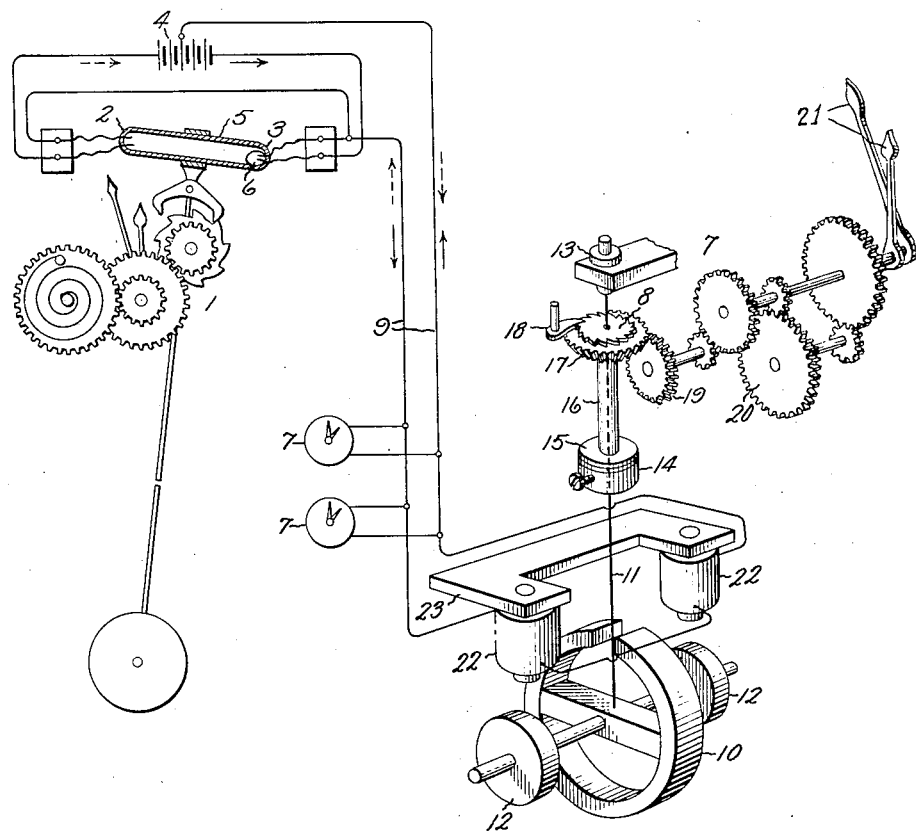
Inventor:
Henry E. Warren,
by Alexander S. Lunt
His Attorney.

Patented Sept. 9, 1924.

1,508,205

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

CLOCK MOTOR.

Application filed October 27, 1922. Serial No. 597,234.

*To all whom it may concern:*

Be it known that I, HENRY E. WARREN, a citizen of the United States, residing at Ashland, in the county of Middlesex, State of Massachusetts, have invented certain new and useful Improvements in Clock Motors, of which the following is a specification.

My invention relates to a novel form of electric motor especially adapted for driving clocks, and more especially secondary clocks such as those driven from a time controlled electric circuit. The objects of my invention are to provide an electric motor of simple construction for secondary clocks and the like which shall be efficient, noiseless and accurate in its operation and one in which it is unnecessary to guard against a wrong direction of rotation.

The features of my invention which I believe to be novel and patentable will be pointed out in the claims appended hereto. A perspective view of my improved motor and a time distributing system with which it is used is shown in the accompanying drawing.

Referring to the drawing, 1 represents a master clock of any suitable type here represented as an ordinary spring driven pendulum clock. This clock in addition to its timing function controls contacts 2 and 3 in the circuit of a battery 4 for controlling a time distributing system represented by the lines 9. In the arrangement illustrated, the battery 4 and clock controlled contacts 2 and 3 constitute a source of alternating current for supplying the time distributing system 9 and the clock 1 causes the alternating current produced to have a definite constant frequency. In this instance the clock contacting device is formed by small glass tube 5 containing a globule of mercury 6 and into the opposite end of this tube are inserted wires connected to the circuits to be controlled. The tube 5 is arranged to be tipped back and forth by the clock movement so that the mercury globule bridges the wires first at one end of the tube and then at the other. In the present illustration the tube is shown secured to an extension of the pendulum stem above its pivot. Other well known arrangements for accomplishing the same result may be substituted. One of the outgoing lines of the system 9 is connected to the center of the battery 4 and the other line is connected to one of the wires inserted at either end of the tube 5. The opposite ends of the batteries are respectively connected to the other wires at opposite ends of the tube. In the position shown, the right hand end of the tube 5 is tilted down so that the mercury globule 6 bridges the contact 3 causing a current to flow into the system 9 from the right half of the battery in the direction shown by the full line arrows. When the pendulum swings to the right, the mercury globule will break the contact at 3 and close those at 2 whereby a current will flow into the system in the opposite direction from the left half of the battery as indicated by the dotted line arrows.

Connected to the system 9 is a plurality of electric motor driven secondary clocks 7 one of which is shown in detail. Referring to the latter, my improved clock motor consists of a heavy polar rotor 10 preferably in the form of a C or U-shaped permanent magnet. This rotor is supported to oscillate about its center of gravity by a torsion wire 11 which may be of tempered steel. Adjusting weights 12 are provided so as to vary the moment of inertia of the rotor and consequently its period of vibration, whereby the motor may be adjusted to operate on circuits of different frequency. A similar result may of course be obtained by altering the free length of the torsion wire. These weights also serve to correctly balance the rotor. The torsion wire is suspended from a suitable clamping device shown at 13. Mounted upon wire 11 at an intermediate point is a collar 14. This collar will have an amount of angular oscillations less than but proportional to that of the rotor 10. Resting upon the collar 14 is a transmission member 15, 16, 17 which may revolve freely around the wire, being guided by suitable bearings at both extremities with a clearance in the center to take care of slight bends or kinks in the wire. The flange 15 is driven frictionally from collar 14. 17 is a bevel gear which is connected to flange 15 by cylindrical portion 16. 18 is a spring dog or pawl cooperating with a ratchet wheel 8 secured to the upper face of bevel gear 17 to prevent rotation of 17 in one direction. If the parts are so arranged that the gear 17 has the correct number of teeth, pawl 18 could cooperate therewith and the ratchet wheel 8 dispensed with.

Rotary motion from bevel gear 17 is transmitted to its mate 19 and from thence through appropriate gears 20 to the hands 21 of the clock 7. 22 are field magnet coils connected in series and supplied from the system 9. These coils are oppositely wound so that at a given instance they produce fields of opposite polarity adjacent the rotor 10. The mechanism is mounted upon a suitable framework 23 which may be of soft steel and thus form a part of the magnetic circuit. It will be obvious that the magnetic field thus formed might have only a single exciting winding instead of two. The rotor 10 is tuned to approximate resonance with the current impulses of the system 9. In the case of a master clock with a standard seconds pendulum and arranged as herein described, the rotor 10 will make a complete oscillation every second. The support 13 of the torsion wire is adjusted and clamped so that the plane of the rotor when at rest is 90 deg. from the plane of the field magnets. This position is illustrated in the drawing. Under these conditions as soon as current impulses are supplied through the system 9, the rotor 10 will begin to oscillate with rapidly increasing amplitude until it swings through an angle somewhat less than 180 deg. It will not tend to swing much, if any, beyond this angle even though the strength of the current impulses should be increased because after reaching this amplitude the effect of stronger impulses is to change the period of vibration of the rotor which automatically checks it. It will however reach a considerable amplitude with very weak current impulses because of its high efficiency as a motor. The amplitude of oscillation of the collar 14 will be a definite fraction to that of rotor 10, for example, this may be one-third or one-fourth of the amplitude of rotor 10. Consequently, the gear 17 will tend to oscillate on account of the frictional contact between 14 and 15 to the same extent. On account of the dog 18, the gear 17 can only revolve in one direction, the effort to move in the other direction being absorbed as friction between 14 and 15. Thus intermittent rotation of 17 will be produced. Obviously the friction drive between 14 and 15 could be altered to a ratchet drive which would be more efficient as far as the waste of energy is concerned, but this would be more complicated and is entirely unnecessary for this kind of service. The transmission of motion from 17 to the clock hands 21 is obvious. The vertical location of the collar 14 on the wire 11 should be such as to give an angular rotation to the ratchet wheel 8 somewhat greater than that corresponding to one of its teeth and less than that corresponding to two teeth. This is a very easy condition to meet and ensures that the gear 17 will be rotated exactly the same distance for every complete vibration of the rotor 10. The gearing 20 is such that these intermittent rotations of gear 17 will cause the clock hands 21 to rotate in synchronism with those of the master clock 1.

I have found that with this device the movements are so gradual that there is no tendency for the inertia of the moving parts to cause over-travel in the feed of the gearing. This is unlike the condition with an ordinary magnet driven ratchet wheel. In that case, the armature moves with such suddenness as to tend to cause over-travel. Furthermore, with my improved device, on account of the gradual movement of the parts, there is no shock and practically no noise. I have found it easy to drive the hands of a clock having a 6" or 8" dial with this mechanism on a continuous energy consumption of less than 1/1000th of a watt which makes it completely feasible to operate a large number of clocks continuously with common dry cell batteries.

It will be obvious that my improved oscillation motor will operate well with either unidirectional impulses separated by proper intervals, or, by alternating current impulses of the same frequency. Consequently, by using the arrangement described, the operation of the secondary clocks will continue even if one of the contacts 2 or 3 should fail. Furthermore, it will be evident that if a soft arm armature is substituted for the permanent magnet armature 10 that the motor would lose its self-starting properties, but if once set in motion would continue to oscillate in synchronism with the electromagnetic impulses of the field. For selective signaling purposes it may be advantageous to have motors of both classes connected to the same circuit and consequently I do not wish to be limited to a motor the armature of which is a permanent magnet. It is not necessary that the normal period of free vibration of the rotor 10 should be exactly the same as the frequency of the impulses. A small difference, such as 1%, will not interfere seriously with resonance. It is therefore obvious that adjusting the rate of the master pendulum, which adjustment would probably never exceed one minute per day, which is approximately 1/14th of 1%, could have no effect on the synchronous operation of the secondary clocks.

Although I have described my improved motor as used in a clock system to drive secondary clocks, it will be obvious that it may advantageously be used for other purposes such, for example, as the operation of advertising devices, the operation of oil feeds in lubricating systems, synchronizing devices, remote control counters and so forth. Likewise, the details of construction might be materially changed without departing from the spirit of my invention and I therefore do not wish to be limited to the exact use and construction shown and described.

What I claim as new and desire to secure by Letters Patent of the United States, is:—

1. In combination a master clock, a secondary clock, a motor for operating said secondary clock comprising, a field magnet having a plurality of cooperating pole pieces, an exciting winding for said magnet, an armature of magnetic material having polar projections equal in number to those of said field magnet rotatively mounted therebetween and resilient means for biasing said armature to a position of maximum reluctance with respect to said field magnets, and an energizing circuit for said field magnets controlled by said master clock.

2. In combination a vertically supported torsional pendulum and means for transforming oscillations of said pendulum, which may be of varying amplitude, into rotative movements of a constant direction and amount, comprising a friction clutch loosely threaded on the torsional supporting member at an intermediate point and having the driving member thereof secured to the torsional supporting member, and a ratchet for limiting the amount of rotation of the driven member of said clutch in one direction.

3. An electric motor for clocks and the like, comprising a field magnet provided with an air gap, an exciting winding therefor, a source of electric energy for energizing said winding, said source being of such a nature as to cause flux pulsations in said magnetic circuit of a substantially constant frequency, a polarized armature rotatively mounted in said air gap in a manner to be oscillated through a position of maximum reluctance with respect to said field magnet and resilient means for biasing said armature to said position of maximum reluctance, said armature having a natural oscillating period of vibration substantially equal to the frequency of said flux pulsations.

In witness whereof, I have hereunto set my hand this 23d day of Oct., 1922.

HENRY E. WARREN.